United States Patent [19]
Scott et al.

[11] Patent Number: 5,098,957
[45] Date of Patent: Mar. 24, 1992

[54] GRAFTING OF HINDERED C-NITRO COMPOUNDS ONTO POLYMERS

[75] Inventors: Gerald Scott, Newby-In-Cleveland, nr Stokesley; Sahar Al-Malaika, Sutton-Coldfield, both of Great Britain

[73] Assignee: AKZO NV, Arnhem, Netherlands

[21] Appl. No.: 390,594

[22] Filed: Aug. 7, 1989

[30] Foreign Application Priority Data

Aug. 9, 1988 [GB] United Kingdom ............... 8818880

[51] Int. Cl.$^5$ ..................... C08F 255/00; C08K 5/32
[52] U.S. Cl. .................................. 525/293; 525/77; 524/259; 524/260
[58] Field of Search ............... 525/77, 293; 524/260, 524/259

[56] References Cited

U.S. PATENT DOCUMENTS

| | | | |
|---|---|---|---|
| 3,650,984 | 3/1972 | Jones | 524/178 |
| 4,007,159 | 2/1977 | Dounchis | 524/186 |
| 4,354,007 | 10/1982 | Scott | 525/370 |
| 4,442,264 | 4/1984 | Zabrocki | 525/293 |
| 4,743,657 | 5/1988 | Rekers et al. | 528/281 |
| 4,885,338 | 12/1989 | Takao | 525/293 |

FOREIGN PATENT DOCUMENTS 124054 2/1977 Fed. Rep. of Germany.

OTHER PUBLICATIONS

Takahashi et al., "The Polymerization and Copolymerization of Nitroalkyl Acrylates and Nitroalkyl Methacrylates", *Journal of Applied Polymer Science*, vol. 12, pp. 1683–1693 (1968).

*Primary Examiner*—John C. Bleutge
*Assistant Examiner*—David Buttner
*Attorney, Agent, or Firm*—Louis A. Morris; David H. Vickrey

[57] ABSTRACT

There is disclosed a method for grafting C-nitro compounds onto preformed polymers. In the method a hindered C-nitro compound containing at least one polymerizable unsaturated group is reacted with a polymer in the presence of free radicals to thereby graft the C-nitro compound onto the polymer. The process has the advantages of being convenient, economical and applicable to conventional polymer processing steps. In a preferred embodiment, polymer stabilizing additives are prepared by the process in the form of masterbatches of polymer containing high concentrations of C-nitro compounds grafted thereon.

13 Claims, No Drawings

GRAFTING OF HINDERED C-NITRO COMPOUNDS ONTO POLYMERS

BACKGROUND OF THE INVENTION

The invention relates to the modification of polymers by grafting hindered C-nitro compounds onto the polymeric substrate.

There is increasing concern about the migration and loss of additives from polymers. The additives, such as antioxidants, stabilizers, plasticizers, antistatic agents, photosensitizers and the like, may be lost from the polymer by volatilization or leaching. Once these additives are lost, they no longer can accomplish their intended purpose. Secondly, when such additives are leached into the surrounding media with which they are in contact, such as foodstuffs or other materials which may be ingested by humans or animals, they may cause danger to the ingestor since some of the materials are toxic in nature. Thirdly, when polymers are employed in medical applications, for example, in surgical goods, prostheses or body implants, it is essential that no migration of additives occurs since the additives are generally not biologically inert and thus they may cause toxicity problems in this environment as well.

Traditionally, additives, and particularly polymer stabilizers, have been relatively low molecular weight materials of high volatility and marginal compatibility with the base polymer. Recently, it has been proposed to overcome the problem of additives migrating out of polymeric materials by copolymerizing antioxidants containing vinyl groups with a major proportion of conventional monomers to give polymers containing the appropriate antioxidant in polymerized form at the required concentration. However, this is an expensive procedure.

It has also been proposed in U.S. Pat. No. 4,354,007 to Scott (hereinafter the '007 patent), that a wide variety of antioxidants and stabilizers may be reacted with preformed polymers in the presence of free radicals to provide a stabilized polymer directly or to make an intermediate, highly concentrated polymer-bound adduct which may be blended with further amounts of a suitable compatible base polymer to give an antioxidant-modified polymer suitable for a wide variety of applications.

The '007 patent describes a wide variety of antioxidant and stabilizer molecules including compounds selected from categories which include chain-breaking and/or peroxide-decomposing antioxidants, ultraviolet screening agents, triplet quenchers and metal deactivators. In terms of a limitation on the scope of the stabilizer compounds that may be used, perhaps the most significant structural limitation is that it should be capable of being activated by a free radical in the polymer (col. 1, lines 40–50). In this regard, however, it has been found with respect to the unsaturated vinyl group-containing stabilizer compounds described in the '007 patent and also with respect to similar stabilizer compounds which have been suggested by others for grafting to pre-formed polymers in the presence of free radicals, that frequently the reactivity of the stabilizer molecules containing polymerizable groups is such that the stabilizer tends to homopolymerize with itself to form a polymer or oligomer. Such a polymer or oligomer may, of course, have increased molecular weight as compared with the individual stabilizer molecule and this increased weight may inhibit undesired volatilization, and/or migration of the stabilizer in the polymer composition.

On the other hand, homopolymerization or oligomerization of the additives generally results in decreased activity of the additive in the polymer system. Thus, antioxidants and stabilizers bound to the polymer in this manner generally show overall lower stabilizing activity when compared with polymer systems containing a comparable amount of grafted antioxidant or stabilizer molecules. Further, the lower molecular weight polymers formed by homopolymerization of the additive are readily extracted from the polymer by extracting media.

Finally, U.S. Pat. No. 4,743,657 discloses a method for preparing polymer bound stabilizer which comprises reacting a stabilizer molecule containing a reactive double bond with a preformed polymer in the presence of a free radical. However, this patent does not disclose C-nitro compounds or that C-nitro compounds can be bound to polymer substrates by the method of the present invention.

Although many attempts have been made to produce nonextractable antioxidants and stabilizers by polymerizing, copolymerizing or grafting of antioxidants containing polymerizable vinyl groups, few commercial products are available in spite of the substantial activity documented in the patent literature. The reasons for lack of commercial success with the prior art methods are essentially:

(i) Homopolymerized antioxidants are incompatible with other polymers and, consequently, have low antioxidant activity.

(ii) Copolymers of vinyl antioxidants and normal monomers, although oxidatively stable, are much more expensive to manufacture than conventional large tonnage plastics such as polyethylene, polypropylene, polyvinylchloride and polystyrene since the scale of manufacture is much reduced. No new oxidatively stable plastics based on these monomers are believed to be in commercial production.

(iii) Grafting of vinyl antioxidants and stabilizers onto preformed polymers has been widely reported, but no commercial products have been produced since the efficiency of the binding process is generally low and the products so produced are not sufficiently effective to justify the cost of the modification procedure.

The cost of modifying all the polymer substrate can, in principle, be avoided by carrying out the modification process in such a way as to produce a concentrated masterbatch of bound antioxidant which can subsequently be used as a normal additive for polymers during the usual polymer processing procedure. This method has been used previously for thiol adducts to the double bond in rubbers, but it much more difficult to employ with saturated polymers due to the inefficiency of the grafting process referred to above. An object of the present invention is to obviate or mitigate the aforesaid disadvantages for C-nitro compounds.

Some of the hindered C-nitro compounds used in the process of the present invention are known, but their use in the method of the present invention has not been suggested before.

The Journal of Applied Polymer Science Vol. 12, pp. 1683–1693 (1968) discloses certain nitro-alkyl acrylates and methacrylates such as 2-methyl-2-nitro-2,3-propylene diacrylate. In this publication homopolymers and copolymers with styrene were tested as fuel binders of solid rocket propellants. No mention is made of the process of the present invention for use with these compounds.

U.S. Pat. No. 4,007,159 discloses hindered phenolic antioxidants such as 2,6-di-t-butyl-4-(2-methyl-2-nitropropyl) phenol. No mention is made of the use of such compounds in a process like that of the present invention.

U.S. Pat. No. 3,650,984 discloses the reaction products of nitroalkanes with organo tin compounds. According to the disclosure, however, the complexes obtained are used in polyvinylhalide resin compositions for stabilization against degradation by heat and the compounds are not employed in a grafting process like that of the present invention.

DD-124 054 discloses the use as light stabilizers, vinylic nitro compounds having the general formula:

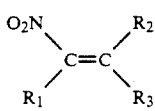

wherein $R_1$, $R_2$ and $R_3$ are chosen from the group of hydrogen or (un)substituted alkyl-, cycloalkyl-, aralkyl-, aryl-, amino-, mercapto-, carbonalkyl-, carboxy-, or heterocyclic groups. However, this patent does not disclose the grafting process of the present invention.

SUMMARY OF THE INVENTION

According to the present invention there is provided a modified polymer comprising a graft copolymer between a hindered C-nitro compound containing at least one polymerizable unsaturated group and a polymer.

The invention also provides a method of preparing the modified polymers comprising reacting together, in the presence of free radicals, a preformed polymer to be modified and a C-nitro-containing monomer composition having at least one polymerizable unsaturated group thereby to graft said monomer to said preformed polymer.

The most preferred embodiment of the present invention results when the preformed polymer and the unsaturated C-nitro compound are in proportions such as to form a masterbatch concentrate for addition to subsequent batches of polymer during polymer processing as a stabilizing additive.

DETAILED DESCRIPTION OF THE INVENTION

The C-nitro compounds useful in the present invention must have at least one polymerizable unsaturated group in the molecule in addition to the nitro functionality. More preferably, at lest two polymerizable groups are present on the C-nitro compound. The polymerizable groups, which may be the same or different, include, but are not limited to, vinyl, acryloyl, methacryloyl, vinyl-substituted aromatic groups or vinyl esters.

The hindered C-nitro compounds contain at least one nitro group ($NO_2$) which is attached to a carbon atom. By hindered it is meant that the carbon atom to which the nitro group is attached, contains at least one non-hydrogen substituent. The non-hydrogen substituents on the carbon to which the nitro group is attached are preferably organic substituents such as methylene groups or alkyl groups.

The hindered C-nitro compound of the present invention preferably comprises at least one moiety of formula A

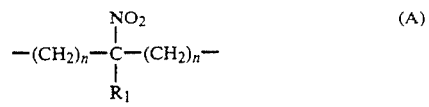

wherein $R_1$ represents hydrogen, a straight or branched, substituted or unsubstituted alkyl group or a substituted or unsubstituted cycloalkyl group, and n represents an integer of from 1 to 4; and at least one unsaturated polymerizable group.

More preferably, the hindered C-nitro compound has the formula V:

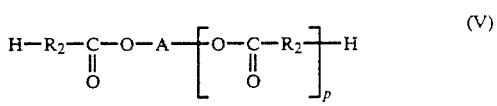

wherein A is defined hereinbefore and $R_2$=alkenylene and p=0 or 1.

Examples of such compounds include 1-acryloyloxy-2-nitro-2-methyl-propane, 1-methacryloyloxy-2-nitro-2-methyl-propane and 1,3-bis-acryloyloxy-2-nitro-2-methylpropane. These compounds are useful for preparing non-blooming UV stabilized polymer compositions. The compounds of the present invention may be grafted onto polymers by the process of the present invention with or without free radical initiators. As with conventional stabilizers, more than one of the above-mentioned compounds may be grafted onto the same polymer and other stabilizers may be employed in addition to these grafted C-nitro compounds.

These acrylated nitro compounds such as acryloyloxy-2-nitro-2-methylpropane (ANMP), 1,3-bis-acryloyloxy-2-nitro-2-methylpropane (BANMP) and 1,3-bis-acryloxy-2-acryloyloxymethyl-2-nitropropane may be obtained by reaction of acryloylchloride with the respective alcohol in the presence of a base.

The polymers to be grafted by the grafting process of the present invention may be any of a wide variety of polymers. Those polymers which contain carbon, hydrogen, oxygen and/or nitrogen may be preferred. Examples include the thermoplastic polymers such as polyolefin homopolymers and copolymers, rubber modified polyolefins, polystyrene, rubber modified polystyrene, polyvinylchloride, polyamides, polyesters, and acrylonitrile-butadiene-styrene. Mixtures or blends of polymers may also be grafted. The polymers will normally have a high molecular weight so that they are suitable for film or fiber forming purposes, although low molecular weight polymers and even liquid polymers may be grafted especially when the adducts are to be used as masterbatch additives to other polymers. It is not necessary for the polymer itself to contain unsaturated groups, although polymer substrates containing unsaturation may be employed. In the case of a masterbatch it is particularly preferable to employ saturated polymers to form the masterbatch concentrate.

The process is particularly suited for binding C-nitro compounds with polymers during melt processing, extrusion or mastication. Under these conditions, the addition of a free radical generator is often beneficial to the grafting process. Examples of suitable free radical generators include organic peroxides such as dicumyl peroxide, azo compounds or redox systems such as a hydroperoxide and a polyamine, or persulfate and a reducing agent.

Alternatively, generation of free radicals can be effected mechanochemically by mastication of the polymer, as in an extruder or internal mixer, or with actinic radiation such as ultraviolet light or gamma radiation. The preferred methods for generating free radicals in the polymer are by the addition of a free radical initiator in low concentrations or by mastication of the polymer at a temperature appropriate for the polymer system.

Where a free radical generator is employed, it will be appreciated that such generator should be nearly completely dissociated by the end of the reaction to prevent reaction of residual generator with the polymer. Preferably, free radical-generating peroxides should make up less than 1% molar fraction and more preferably less than 0.4% molar fraction.

It may also be possible to carry out the grafting process as a two step reaction wherein hydroperoxides are first introduced into the polymer to be grafted and then this peroxypolymer is grafted using the peroxide functionality in the polymer as the free radical generator.

During the grafting reaction, other monomers may also be present so long as they do not substantially affect the character of the grafting of the C-nitro compounds. Thus, for example, other monomers containing stabilizer functionalities may be simultaneously grafted onto the polymer substrate. Cross-linking or polymer degradation may also be done at the same time if such is desirable.

The grafted C-nitro compounds may be grafted in any amount of from 0.01 percent up to as much as 60% of the polymer. The lower percentages of between 0.01 and 10% are generally employed to stabilize the polymer, whereas the higher percentages of 10–60% are employed when making masterbatches for subsequent introduction into fresh, unstabilized polymer whereby the additive will be diluted. Most preferably the stabilizers of the present invention will be present in the final, stabilized polymer in concentrations up to 3%.

The temperature at which the C-nitro compound is grafted onto the polymer substrate will depend upon the polymer, the amount of initiator present and the processing conditions. Generally, temperatures in the range of 0°–325° C. will be suitable. Below the preferred temperature range, the reaction time becomes uneconomical, whereas above the preferred temperature range, undesirable secondary reactions may occur.

The present process provides a convenient and economical way to produce C-nitro group-containing polymers by direct grafting during polymer manufacturing or subsequent polymer processing steps. It is essentially preferred to prepare masterbatches of C-nitro-containing polymer which can be introduced during polymer extrusion or mixing as a stabilizing additive.

The present process has the distinct advantage that substantially all of the C-nitro containing compound is bound to the polymer during commonly used polymer processing steps. In this manner, polymers possessing excellent properties attributable to the polar nitro group can be efficiently and economically obtained. Further, the resultant polymers will not leach out the nitro additive since it is bound into the polymer backbone.

The following examples serve to further illustrate the subject matter of the present invention and are not to be construed as limiting the invention in any way.

EXAMPLE 1

A mixture of unmodified polypropylene and 1,3-diacryloyloxy-2-methyl-2-nitropropane (DAMNP) in a weight ratio of 9:1, was processed in an internal mixer at 180° C. with the addition of dicumyl peroxide (DCP) at a molar ratio of 0.002:1 based on the DAMNP. The reaction time was 15 minutes. The product was compression moulded into a film and the amount of the DAMNP remaining after exhaustive extraction with methylene dichloride was estimated by UV spectroscopy. This was found to be 100% of the amount incorporated during processing. Additionally, no DAMNP could be detected in the extracting solvent.

EXAMPLE 2

1,3-Diacryloyloxy-2-acryloyloxymethyl-2-nitropropane (DAANP) was reacted with the polypropylene under the conditions of Example 1, but without the addition of DCP. The nitro compound was found to be 100% bound to the polymer.

EXAMPLE 3

The nitroacrylates acryloyloxy-2-nitro-2-methylpropane (ANMP), a tris-nitroacrylate of the formula:

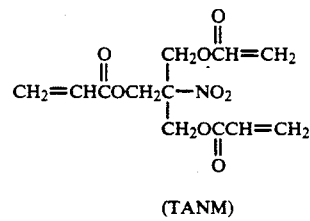

(TANM)

and 1,3-bisacryloyloxy-2-nitro-2-methylpropane (BANMP) were obtained by reaction of acyloyl-chloride with the respective alcohol in the presence of a base.

Melt grafting of these nitroacrylates was carried out by processing a 5% masterbatch of each additive in polypropylene for 10 minutes using a Brabender torque rheometer at 190° C. The radical initiator dicumyl peroxide (at various additive/peroxide ratios) also served to optimize the grafting efficiency of the additive. The diluted masterbatch was obtained by mixing the above (1 part) with 10 parts of unstabilized polypropylene.

The grafting efficiency of the nitroacrylate masterbatches after exhaustive extraction with methylene chloride of the compression moulded polymer fibres (0.2 mm thickness) was measured by Fourier Transform infra red (FTIR) spectroscopy (Perkin-Elmer). Grafting efficiency was determined following changes in the absorption intensity of the functional groups, firstly before extraction and then at time intervals during extraction. The results obtained are as follows.

TABLE 1

| Grafting of Nitroacrylates onto Propylene | | | |
|---|---|---|---|
| | | | % Grafted |
| Unstabilized PP | | | — |
| ANMP | + 0.4% | DCP | 70.0 |
| ANMP | + 1% | DCP | 94.6 |
| ANMP | + 2.5% | DCP | 100.0 |
| BANMP | | | 38.4 |
| BANMP | + 0.25% | DCP | 77.0 |
| BANMP | + 0.4% | DCP | 100.0 |
| BANMP | + 1% | DCP | 100.0 |
| BANMP | + 2.5% | DCP | 100.0 |

TABLE 1-continued

| Grafting of Nitroacrylates onto Propylene | |
|---|---|
| | % Grafted |
| TANM + 1.0% DCP | 100.0 |

We claim:

1. A process for grafting hindered C-nitro compounds onto polymers comprising reacting a hindered C-nitro compound having at least one polymerizable unsaturated group with a polymer in the presence of free radicals at a temperature sufficient to graft said hindered C-nitro compound onto said polymer wherein the hindered C-nitro compound comprises at least one moiety of formula A

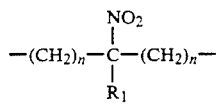

wherein $R_1$ represents hydrogen or a straight or branches substituted or unsubstituted alkyl group or a substituted or unsubstituted cycloalkyl group, and n represents an integer of from 1 to 4.

2. The process of claim 1 wherein said hindered C-nitro compound is not readily homopolymerizable.

3. The process of claim 1 wherein the hindered C-nitro compound has the formula V:

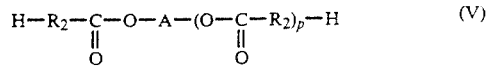

wherein A is defined in claim 1 and $R_2$=alkenylene and p=0 or 1.

4. The process of claim 1 wherein said hindered C-nitro compound comprises at least two polymerizable unsaturated groups.

5. The process of claim 1 wherein said hindered C-nitro compound comprises up to 10 weight percent based on the polymer.

6. The process of claim 3 wherein said hindered C-nitro compound comprises up to 10 weight percent based on the polymer.

7. The process of claim 1 wherein said hindered C-nitro compound comprises from 10 to 50 weight percent based on the polymer.

8. The process of claim 3 wherein said hindered C-nitro compound comprises from 10 to 50 weight percent based on the polymer.

9. The process of claim 1 wherein substantially no free monomers are present in the modified polymer obtained by the process.

10. The process of claim 1 wherein a free radical initiator is employed as the source of free radicals in the process.

11. The process of claim 3 wherein a free radical initiator is employed as the source of free radicals in the process.

12. The process of claim 1 wherein the polymer is selected from the group consisting of polyolefins.

13. A polymer containing C-nitro compound, said polymer made by the process of claim 12.

* * * * *